United States Patent
Kolb et al.

(10) Patent No.: US 11,375,712 B2
(45) Date of Patent: Jul. 5, 2022

(54) AGROCHEMICAL SUSPENSION CONCENTRATE COMPRISING AN ALKOXYLATED ALCOHOL DISSOLVED IN THE AQUEOUS PHASE

(71) Applicant: BASF SE, Ludwigshafen (DE)

(72) Inventors: Klaus Kolb, Schifferstadt (DE); Katja Marxer, Maxdorf (DE); Anja Simon, Weinheim (DE); Rainer Berghaus, Speyer (DE)

(73) Assignee: BASF SE, Ludwigshafen (DE)

( * ) Notice: Subject to any disclaimer, the term of this patent is extended or adjusted under 35 U.S.C. 154(b) by 43 days.

(21) Appl. No.: 15/508,667

(22) PCT Filed: Aug. 6, 2015

(86) PCT No.: PCT/EP2015/068131
§ 371 (c)(1),
(2) Date: Mar. 3, 2017

(87) PCT Pub. No.: WO2016/041693
PCT Pub. Date: Mar. 24, 2016

(65) Prior Publication Data
US 2017/0258076 A1    Sep. 14, 2017

(30) Foreign Application Priority Data
Sep. 16, 2014  (EP) ..................... 14184945

(51) Int. Cl.
*A01N 25/04* (2006.01)
*A01N 43/70* (2006.01)
*A01N 43/80* (2006.01)
*C08G 65/26* (2006.01)
*A01N 43/42* (2006.01)
*A01N 25/30* (2006.01)

(52) U.S. Cl.
CPC ............ *A01N 25/04* (2013.01); *A01N 25/30* (2013.01); *A01N 43/42* (2013.01); *A01N 43/70* (2013.01); *A01N 43/80* (2013.01); *C08G 65/2609* (2013.01); *C08G 2650/58* (2013.01)

(58) Field of Classification Search
USPC ......................................................... 504/362
See application file for complete search history.

(56) References Cited

U.S. PATENT DOCUMENTS

| 4,115,457 A | 9/1978 | Wiedemann |
| 2008/0064756 A1* | 3/2008 | Berghaus ............... A01N 37/52 514/617 |

FOREIGN PATENT DOCUMENTS

| EP | 0 394 847 A2 | 10/1990 |
| EP | 1023832 A1 | 8/2000 |
| EP | 2615919 B1 | 1/2015 |
| EP | 3193621 B1 | 11/2018 |
| WO | 95/18531 A1 | 7/1995 |
| WO | 9903345 A1 | 1/1999 |
| WO | 03/090531 A1 | 11/2003 |
| WO | 2008/132150 A1 | 11/2008 |
| WO | 2009/013247 A2 | 1/2009 |
| WO | 2009/130281 A1 | 10/2009 |

OTHER PUBLICATIONS

International Search Report issued in International Application No. PCT/EP2015/068131 dated Sep. 29, 2015.
Written Opinion issued in International Application No. PCT/EP2015/068131 dated Sep. 29, 2015.
International Preliminary Reporton Patentability issued in International Application No. PCT/EP2015/068131 dated Aug. 22, 2016.

* cited by examiner

Primary Examiner — Johann R Richter
Assistant Examiner — Courtney A Brown
(74) Attorney, Agent, or Firm — Armstrong Teasdale LLP

(57) ABSTRACT

The present invention relates to an agrochemical aqueous suspension concentrate comprising a pesticide in the form of pesticide particles and at least 5 wt % of an adjuvant dissolved in the aqueous phase, wherein the adjuvant is of the formula (I) as defined herein. The invention also relates to the adjuvant as defined in formula (I). Furthermore, the invention relates to a process for the preparation of the suspension concentrate by contacting water, the pesticide, and the adjuvant. The present invention further relates to a method of controlling phytopathogenic fungi and/or undesired plant growth and/or undesired insect or mite attack and/or for regulating the growth of plants.

12 Claims, No Drawings

AGROCHEMICAL SUSPENSION CONCENTRATE COMPRISING AN ALKOXYLATED ALCOHOL DISSOLVED IN THE AQUEOUS PHASE

CROSS-REFERENCE TO RELATED APPLICATIONS

This application is a U.S. National Phase Application of PCT/EP2015/068131, filed Aug. 6, 2015, which claims the benefit of priority to EP Application No. 14184945.5, filed Sep. 16, 2014, the contents of which are hereby expressly incorporated by reference in their entirety.

The present invention relates to an agrochemical aqueous suspension concentrate comprising a pesticide in form of pesticide particles and at least 5 wt % of an adjuvant dissolved in the aqueous phase, where the adjuvant is of the formula (I) as defined herein. The invention also relates to the adjuvant as defined in formula (I). Furthermore, the invention relates to a process for the preparation of said suspension concentrate by contacting water, the pesticide, and the adjuvant. Further subject matter are a method of controlling phytopathogenic fungi and/or undesired plant growth and/or undesired insect or mite attack and/or for regulating the growth of plants, wherein the suspension concentrate is allowed to act on the respective pests, their environment or the crop plants to be protected from the respective pest, on the soil and/or on undesired plants and/or on the crop plants and/or on their environment; and seed containing said suspension concentrate. The present invention comprises combinations of preferred features with other preferred features.

Agrochemical suspension concentrates (also known as "SC" type formulations) comprising adjuvants are known. Many adjuvants have low water solubility and are thus difficult to incorporate into an aqueous formulation concentrates at high concentrations. Often, such adjuvants should be mixed instead by the farmer before application into a tank mix prepared by diluting the formulation concentrate with water. This additional mixing step of an adjuvant to the tank mix is disadvantageous, because it requires additional time, additional storage space and time for buying an adjuvant, as well as additional handling of dangerous chemicals.

Object of the present invention was to identify an adjuvant, which may be dissolved in aqueous suspension concentrates, and to provide a convenient crop protection product, which needs no additional tank mixing of an adjuvant.

The object was achieved by an agrochemical aqueous suspension concentrate comprising a pesticide in form of pesticide particles and at least 5 wt % of an adjuvant dissolved in the aqueous phase, where the adjuvant is of the formula (I)

$$R^1\text{—O-EO}_m\text{—PO}_n\text{-EO}_o\text{—H} \quad (I)$$

where
$R^1$ is a $C_{12-20}$ alkyl;
EO is ethyleneoxy;
PO is propyleneoxy;
m has a value from 1 to 20;
n has a value from 1 to 30; and
o has a value from 1 to 10.

$R^1$ is preferably $C_{14-20}$ alkyl, or a mixture thereof. More preferably, $R^1$ is $C_{16-18}$ alkyl, or a mixture thereof.

$R^1$ may be a linear or branched alkyl; preferably $R^1$ is a linear alkyl.

$R^1$ may be a saturated or unsaturated alkyl; preferably $R^1$ is a saturated alkyl.

Typically, $R^1$ is a linear $C_{12-20}$ alkyl, or a mixture thereof, preferably linear $C_{14-20}$ alkyl, or a mixture thereof, especially preferred linear $C_{16-18}$ alkyl, or a mixture thereof.

Typically, $R^1$ is linear and saturated $C_{12-20}$ alkyl, or a mixture thereof, preferably linear and saturated $C_{14-20}$ alkyl, or a mixture thereof, especially preferred linear and saturated $C_{16-18}$ alkyl, or a mixture thereof.

In another form, $R^1$ is linear and unsaturated $C_{12-20}$ alkyl, or a mixture thereof, preferably linear and unsaturated $C_{14-20}$ alkyl, or a mixture thereof, especially preferred linear and unsaturated $C_{16-18}$ alkyl, or a mixture thereof.

In another form, $R^1$ is linear and a mixture of saturated and unsaturated $C_{12-20}$ alkyl, or a mixture thereof, preferably linear and a mixture of saturated and unsaturated $C_{14-20}$ alkyl, or a mixture thereof, especially preferred linear and a mixture of saturated and unsaturated $C_{16-18}$ alkyl, or a mixture thereof.

The index m is usually a value from 2 to 15, more preferably from 3 to 15 and in particular from 3 to 10. In another preferred form, m is from 3 to 8, more preferably from 3 to 6 and in particular 3 to 5. Particularly preferred are values from 3.5 to 4.5.

The index n is usually a value from 5 to 30, more preferably from 8 to 30 and in particular from 10 to 25. In another preferred form, n is from 10 to 20, more preferably from 12 to 15 and in particular 13 to 15.

The index o is usually a value from 2 to 10, more preferably from 3 to 10 and in particular from 3 to 7. In another preferred form, o is from 3 to 6, more preferably from 3.5 to 6 and in particular 3.5 to 5.

In another form $R^1$ is a linear or branched $C_{14-20}$ alkyl, the index m is from 2 to 15, the index n is from 5 to 30 and the index o is from 3 to 10.

In another form $R^1$ is a linear $C_{14-18}$ alkyl, the index m is from 3 to 15, the index n is from 9 to 25 and the index o is from 3 to 6.5.

In another form $R^1$ is a linear or branched $C_{16-18}$ alkyl, the index m is from 3 to 8, the index n is from 11 to 20 and the index o is from 3.5 to 5.5.

The solubility of the adjuvant in distilled water at 23° C. is typically at least 1 g/l, preferably at least 5 g/l and more preferred at least 10 g/l.

The adjuvant may be prepared by known synthetic methods, such as disclosed in WO 2003/090531. Usually, an alcohol $R^1$—OH is reacted stepwise with ethylene oxide, propylene oxide and ethylene oxide.

The suspension concentrate may comprise a second adjuvant, where the second adjuvant is of the formula (II)

$$R^2\text{—O-EO}_x\text{-PO}_y\text{-EO}_z\text{—H} \quad (II)$$

where
$R^2$ is a C6-11 alkyl;
EO is ethyleneoxy;
PO is propyleneoxy;
x has a value from 1 to 20;
y has a value from 1 to 30; and
z has a value from 0 to 10.

$R^2$ is usually a linear or branched (preferably branched) monovalent $C_{6-11}$ aliphatic hydrocarbon group, or a mixture thereof, preferably a linear or branched $C_{8-10}$ aliphatic hydrocarbon group. More preferably, $R^2$ is a linear or branched, saturated or unsaturated $C_{8-10}$ aliphatic hydrocarbon group, especially preferred linear or branched Cio alkyl, or a mixture thereof. Typical examples for $R^2$ are linear or branched (preferably branched) hexyl, heptyl, octyl, nonyl, decyl and undecyl, or a mixture of the aforementioned residues.

In another form, typical examples for $R^2$ are linear or branched (preferably branched) octyl, nonyl and decyl, or a mixture of the aforementioned residues. In another form, $R^2$ is linear or branched decyl, or a mixture of the aforementioned residues. In particular, $R^2$ is 2-propyl-heptyl.

In a preferred form
$R^2$ is a linear or branched (preferably branched) hexyl, heptyl, octyl, nonyl, decyl and undecyl, or a mixture of the aforementioned residues;
x has a value from 1 to 20;
y has a value from 1 to 30; and
z has a value from 1 to 10.

In another preferred form
$R^2$ is a linear or branched (preferably branched) hexyl, heptyl, octyl, nonyl, decyl and undecyl, or a mixture of the aforementioned residues;
x has a value from 3 to 15;
y has a value from 2 to 10; and
z has a value from 1.5 to 8.

In another preferred form
$R^2$ is a linear or branched (preferably branched) hexyl, heptyl, octyl, nonyl, decyl and undecyl, or a mixture of the aforementioned residues;
x has a value from 4 to 8;
y has a value from 3 to 6; and
z has a value from 2 to 4.

In another preferred form
$R^2$ is a branched hexyl, heptyl, octyl, nonyl, decyl and undecyl, or a mixture of the aforementioned residues;
x has a value from 5 to 6;
y has a value from 4 to 5; and
z has a value from 2 to 3.

In another form
$R^2$ is a $C_{8-11}$ alkyl;
x has a value from 2 to 15;
y has a value from 2 to 15; and
z has a value of 0.

In another form
$R^2$ is a $C_{9-11}$ alkyl;
x has a value from 3 to 10;
y has a value from 3 to 10; and
z has a value of 0.

The concentration of the second adjuvant in the suspension concentrate as described above may be from 10 to 500 g/l, more preferably from 50 to 250 g/l, especially preferred from 50 to 200 g/l and in particular from 50 to 150 g/l. Typically, the concentration of the second adjuvant in the suspension concentrate is from 100 to 150 g/l.

The suspension concentrate typically relates to a composition, which comprises solid particles (e.g. pesticide particles), which are homogenously dispersed in a continuous aqueous phase. A suspension concentrate (SC) is typically a conventional type of formulation in the field of the agrochemical formulations. In suspension concentrates of a pesticide, the suspension is preformed in the commercial product and is conventionally diluted with a carrier, such as water, when making up the spray mixture (also called the tank mix). The continuous aqueous phase of the suspension concentrate is usually free of other dispersed phases beside the pesticide particles. Typically, the pesticide particles are the only dispersed phase in the aqueous phase.

The suspension comprises a pesticide (e.g. a water-insoluble pesticide) in form of pesticide particles, which are usually suspended in a continuous aqueous phase. The pesticide particles may be present in the form of crystalline or amorphous particles, which are solid at 20° C. The pesticide particles usually have a particle size distribution with an x50 value of from 0.1 to 10 μm, preferably 0.2 μm to 5 μm and especially preferably 0.5 μm to 2.5 μm. The particle size distribution can be determined by laser light diffraction of an aqueous suspension comprising the particles. The sample preparation, for example the dilution to the measuring concentration, will, in this measuring method, depend on the fineness and concentration of the active substances in the suspension sample and on the apparatus used (for example a Malvern Mastersizer), inter alia. The procedure should be developed for the system in question and is known to a person skilled in the art.

The suspension is an aqueous suspension, which means the suspension comprises water. The suspension can comprise at least 5% by weight, preferably at least 10% by weight and especially preferably at least 15% by weight of water based on the total weight of the suspension. The suspension can comprise from 20 to 85% by weight, preferably from 30 to 75% by weight and especially preferably from 35 to 70% by weight of water, based on the total weight of the suspension.

The suspension concentrate usually comprises less than 10 wt %, preferably less than 5 wt % and in particular less than 1 wt % of an organic solvent. In another form the suspension concentrate is essentially free of an organic solvent. Examples for organic solvents are water-immiscible solvent and water-soluble solvents. The water-immiscible solvent may be soluble in water at 20° C. up to 50 g/l, preferably up to 20 g/l, and in particular up to 5 g/l. The water-soluble solvent may be soluble in water at 20° C. more than 50 g/l, preferably more than 100 g/l.

The suspension may comprise less than 10 wt %, preferably less than 3 wt % and in particular less than 1 wt % of the water-immiscible solvent. In another form the suspension is essentially free of a water-immiscible solvent. Examples for water-immiscible solvents are
  a hydrocarbon solvent such a an aliphatic, cyclic and aromatic hydrocarbons (e. g. toluene, xylene, paraffin, tetrahydronaphthalene, alkylated naphthalenes or their derivatives, mineral oil fractions of medium to high boiling point (such as kerosene, diesel oil, coal tar oils));
  a vegetable oil such as corn oil, rapeseed oil;
  a fatty acid ester such as $C_1$-$C_{10}$-alkylester of a $C_{10}$-C22-fatty acid; or
  methyl- or ethyl esters of vegetable oils such as rapeseed oil methyl ester or corn oil methyl ester.

Usually, the suspension comprises less than 10% by weight, preferably less than 3% by weight, especially preferably less than 1% by weight of the water-soluble solvent. In one form the suspension is essentially free of a water-soluble solvent. Examples of water soluble solvents are dimethyl sulfoxide (DMSO) or N-methyl pyrrolidone.

The term pesticide refers to at least one active substance selected from the group of fungicides, insecticides, nematicides, herbicides, safeners, biopesticides and/or growth regulators. Preferred pesticides are fungicides, insecticides, herbicides and growth regulators. Especially preferred pesticides are insecticides. Mixtures of pesticides of two or more of the abovementioned classes may also be used. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

The suspension concentrate may comprise at least one pesticide (e.g. one, two or three pesticides) in form of pesticide particles.

The pesticide may comprise at least one water-insoluble pesticide. Water-insoluble pesticides may have solubility in water of up to 10 g/l, preferably up to 1 g/l, and in particular up to 0.5 g/l, at 20° C. The water solubility is usually measured at pH 7.0.

The pesticide, such as the water-insoluble pesticide, usually has a melting point of above 30° C., preferably above 50° C. and specifically above 70° C.

Usually, the suspension concentrate comprises from 10 to 600 g/l, preferably from 50 to 400 g/l, especially preferably from 100 to 400 g/l of the pesticide in form of pesticide particles.

The suspension concentrate usually has a pH from 5.5 to 8.5, preferably form 6.5. to 7.5.

The suspension may comprise a further pesticide in addition to the pesticide in form of pesticide particles, where the further pesticide is dissolved in the aqueous phase of the suspension. Usually, the suspension concentrate comprises from 1 to 300 g/l, preferably from 5 to 150 g/l, especially preferably from 10 to 100 g/l of the further pesticide.

In a form the suspension concentrate comprises from 50 to 400 g/l of the pesticide, 10 to 500 g/l of the adjuvant, where R' is a $C_{14-20}$ alkyl, m has a value from 1 to 20, n has a value from 1 to 6, and o has a value from 1 to 6, and optionally 1 to 300 g/l of the further pesticide, as well as optionally of 10 to 500 g/l of the further adjuvant.

In another form the suspension concentrate comprises from 100 to 400 g/l, 50 to 250 g/l of the adjuvant, where R' is a $C_{16-20}$, m has a value from 2 to 5, n has a value from 1 to 30, and o has a value from 2 to 6, and optionally 5 to 150 g/l of the further pesticide, as well as optionally a total of 50 to 500 g/l of the further adjuvant.

In another form the suspension concentrate comprises from 150 to 350 g/l of the pesticide, 50 to 150 g/l of the adjuvant, where R' is a $C_{16-18}$ alkyl, m has a value from 3.5 to 4.5, n has a value from 13 to 15, and o has a value from 3.5 to 4.5, and optionally 5 to 100 g/l of the further pesticide, as well as optionally a total of 50 to 200 g/l of the further adjuvant.

The suspension concentrate may comprise auxiliaries for agrochemical formulations. Examples for suitable auxiliaries are solid carriers or fillers, surfactants, dispersants, emulsifiers, wetters, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

The suspension preferably comprises an anionic surfactant. Preferred anionic surfactants are sulfonates, where sulfonates of condensed naphthalenes are more preferred. The suspension may comprise from 1 to 100 g/l, preferably from 10 to 70, and in particular from 15 to 45 g/l of the anionic surfactant (e.g. the sulfonate).

Suitable nonionic surfactants are alkoxylates, N-substituted fatty acid amides, amine oxides, esters, sugar-based surfactants, polymeric surfactants, and mixtures thereof. Examples of alkoxylates are compounds such as alkylphenols, amines, amides, arylphenols, fatty acids or fatty acid esters, which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

The suspension may be employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying or treating the suspension on to plant propagation material, especially seeds include dressing, coating, pelleting, dusting, soaking and in-furrow application methods of the propagation material. Preferably, the suspension is applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha. In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required. When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the suspen sion as premix or, if appropriate not until immediately prior to use (tank mix). These agents can be admixed with the suspensions according to the invention in a weight ratio of 1:100 to 100:1, preferably 1:10 to 10:1.

The user applies the suspension or the tank mix prepared from the suspension usually from a predosage device, a knapsack sprayer, a spray tank, a spray plane, or an irrigation system. Usually, the suspension is made up with water, buffer, and/or further auxiliaries to the desired application concentration and the ready-to-use spray liquor or the agrochemical suspension according to the invention is thus obtained. Usually, 20 to 2000 liters, preferably 50 to 400 liters, of the ready-to-use spray liquor are applied per hectare of agricultural useful area.

The present invention further relates to the adjuvant of the formula (I)

$$R^1\text{—O-EO}_m\text{—PO}_n\text{-EO}_o\text{—H} \quad\quad\quad (I)$$

where
$R^1$ is a $C_{12-20}$ alkyl;
EO is ethyleneoxy;
PO is propyleneoxy;
m has a value from 1 to 20;
n has a value from 1 to 30; and
o has a value from 1 to 10.

Preferred embodiments of the adjuvant are as above.

The present invention further relates to a method of preparing the suspension concentrate by contacting water, the pesticide, and the adjuvant, and optionally the auxiliaries. The contacting may be achieved in a known manner, such as described by Mollet and Grubemann, Formulation technology, Wiley VCH, Weinheim, 2001; or Knowles, New developments in crop protection product formulation, Agrow Reports DS243, T&F Informa, London, 2005. Usually, the contacting is achieved by mixing (e.g. in a high shear mixer) at ambient temperatures (e.g. 10 to 40° C.).

The present invention further relates to a method of controlling phytopathogenic fungi and/or undesired plant growth and/or undesired insect or mite attack and/or for regulating the growth of plants, wherein the suspension concentrate is allowed to act on the respective pests, their environment or the crop plants to be protected from the respective pest, on the soil and/or on undesired plants and/or on the crop plants and/or on their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweet leaf (Stevie rebaudania); rubber plants and forest plants, for example flowers, shrubs, deciduous trees and coniferous trees, and propagation material, for example seeds, and harvested produce of these plants.

The term crop plants also includes those plants, which have been modified by breeding, mutagenesis or recombinant methods, including the biotechnological agricultural products, which are on the market or in the process of being developed. Genetically modified plants are plants whose genetic material has been modified in a manner, which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The present invention further relates to seed containing the suspension concentrate.

The advantages of the suspension concentrate according to the invention are high storage stability, even at varying or low temperatures. In particular, no phase separation or agglomeration is observed during storage. The particle size in the suspension concentrate is small and/or stable. Another advantage is the high rainfastness of the suspension on the crops; a reduced toxicity (e.g. eye toxicity). There is no need for the farmer to mix an adjuvant before application into a tank mix prepared by diluting the formulation concentrate with water. It is advantageous to avoid this additional mixing step of an adjuvant to the tank mix, because it requires additional time, additional storage space and time for buying an adjuvant, as well as additional handling of dangerous chemicals. Further advantages are that the adjuvant is dissolved in aqueous suspension concentrates, or that the suspension concentrate provides a convenient crop protection product, which needs no additional tank mixing of an adjuvant.

The examples which follow illustrate the invention without imposing any limitation.

EXAMPLES

Adjuvant A: Adjuvant of the formula (I), where $R^1$ is a linear $C_{16-18}$ alkyl, m is 3.9, n is 14 and o is 4.
Adjuvant B: Adjuvant of the formula (II), where $R^2$ is 2-propyl-heptyl, x is 5.7, y is 4.7 and z is 2.3
Adjuvant C: Adjuvant of the formula (II), where $R^2$ is $C_{9-11}$, x is 6, y is 6 and z is 0.
Antifoamer: Silicon defoamer.
Auxiliary A: Triblock copolymer based on poly(propylene oxide) core flanked by poly(ethylene oxide) groups, $M_w$ approximately 6500, cloud point in water greater 100° C.
Auxiliary B: Liquid polyether-modified trisiloxane, surface tension 22 mN/m, density 1.02 g/ml.
Wetting Agent: Polymer of hydroxybenzenesulfonic acid, formaldehyde, phenol and urea.
Thickener: Granules of magnesium aluminium silicate.
Ionic Surfactant A: Phenol sulfonic acid condensation product.
Ionic Surfactant B: Alkylaryl sufonate.
Bactericide: Aqueous mix of 2-methyl-4-isothiazolin-3-one and 1,2-benzisothiazolin -3-one.
Stabilizer A: $C_{12-15}$ fatty alcohol ethoxylate, with an HLB index of 15.5.
Stabilizer B: Methyl methacrylate graft co-polymer with polypropylene glycol side chains, HLB index of 11-12.

Example 1

Solubility and Comparative Adjuvants 10 g of Adjuvant A was filled up to 100 ml with distilled water at 23° C. and stirred. A clear solution was formed.

For comparison, Adjuvant Comp1 was prepared, which was identical to Adjuvant A except that index o was zero. 10 g of Adjuvant Comp1 was filled up to 100 ml with distilled water at 23° C. and stirred. Adjuvant Comp1 was not dissolved.

Example-2

Preparation of Atrazine and Topramezone Suspension Concentrates B-D

The Atrazine and Topramezone SC's B-D were prepared by mixing water, the pesticides, Adjuvant A, Adjuvant B, Auxiliary A, Sodium Hydroxide, the Wetting Agent and the Antifoamer. This mixture was wet-milled using a bead mill to a particle size around 2 μm. Propylene glycol, Bactericide, Xanthan Gum and Thickener were added and mixed resulting in a uniform suspension of pH 7.5 to 8.5. The final concentration of the components is given in Table 2. Adjuvant A was dissolved in the aqueous phase.

TABLE 2

| Component | B (g/l) | C (g/l) | D (g/l) |
|---|---|---|---|
| Atrazine | 300 | 300 | 300 |
| Topramezone | 10 | 10 | 10 |
| Adjuvant A | 125 | 100 | 75 |
| Adjuvant B | 125 | 100 | 75 |
| 1,2-Propylene Glycol | 50 | 50 | 50 |
| Bactericide | 2.0 | 2.0 | 2.0 |
| Auxiliary A | 30 | 30 | 30 |
| Xanthan Gum | 1.0 | 1.0 | 1.0 |
| Sodium Hydroxide | 1.1 | 1.1 | 1.1 |
| Thickener | 2.0 | 2.0 | 2.0 |
| Antifoamer | 5.0 | 5.0 | 5.0 |
| Wetting Agent | 20 | 20 | 20 |
| Water | To 1 liter | To 1 liter | To 1 liter |

Example-5

Preparation of Atrazine and Topramezone Suspension Concentrates E-J

The Atrazine and Topramezone SC's E-J were prepared by mixing water, the pesticides, Adjuvant A, Adjuvant B, Adjuvant C, the Ionic Surfactant A, Auxiliary A, Auxiliary B and the Antifoamer. This mixture was wet-milled using a bead mill to a particle size around 2 μm. Propylene glycol, Bactericide and Xanthan Gum were added and mixed resulting in a uniform suspension. The final concentration of the components is given in Table 3. Adjuvant A was dissolved in the aqueous phase.

TABLE 3

| Component | E (g/l) | F (g/l) | G (g/l) | H (g/l) | I (g/l) | J (g/l) |
|---|---|---|---|---|---|---|
| Atrazine | 375 | 300 | 250 | 250 | 250 | 250 |
| Topramezone | 15 | 12 | 10 | 10 | 10 | 10 |
| Adjuvant A | 250 | 250 | 250 | 125 | 125 | 125 |
| Adjuvant B | — | — | — | — | 125 | — |
| Adjuvant C | — | — | — | 125 | — | — |
| Ionic Surfactant A | 40 | 20 | 40 | 40 | 40 | 40 |
| Ionic Surfactant B | 50 | 50 | 0 | 0 | 0 | 0 |
| 1,2-Propylene Glycol | 50 | 50 | 80 | 80 | 80 | 80 |
| Bactericide | 2 | 2 | 2 | 2 | 2 | 2 |
| Auxiliary A | 30 | 30 | 30 | 30 | 30 | 30 |
| Auxiliary B | — | — | — | — | — | 125 |
| Xanthan Gum | 3 | — | — | — | — | — |
| Antifoamer | 5 | 5 | 5 | 5 | 5 | 5 |
| Water | To 1 liter | To 1 liter | To 1 liter | To 1 liter | To 1 liter | To 1 liter |

Example-6

Stability of the Particle Size of SC B-J

The increase of the particle size upon storage of SC B-J was tested with a sample at 54° C. for two weeks, with another sample in a daily cycling temperature from −10° C. to +10° C. for two weeks, and with another sample at −10° C. for two weeks, respectively.

The particle size of the pesticide particles was determined before and after storage by Malvern Mastersizer 2000. No increase in particle size was found at all storage temperatures.

Example-7

Storage Stability of SC B-J

For evaluation of the storage stability of SC B-J, samples were prepared as described in Example-6.

The SC-stability was determined by visual observation of the samples. No noticeable phase separation occurred in all samples.

Example-8

Preparation of Imazamox and Quinmerac SC's

The Imazamox and Quinmerac SC's K-M were prepared by mixing water, the pesticides, Adjuvant A, Adjuvant B, Stabilizer A, Stabilizer B and the Antifoamer. This mixture was wet-milled using a bead mill to a particle size around 2 μm.

Propylene glycol, Biocide and Xanthan Gum were added and mixed resulting in a uniform suspension of pH 3-4. The final concentration of the components is given in Table 4. Adjuvant A was dissolved in the aqueous phase.

TABLE 4

| Component | K (g/l) | L (g/l) | M (g/l) |
|---|---|---|---|
| Imazamox | 17.5 | 35.0 | 23.33 |
| Quinmerac | 125 | 250 | 166.67 |

TABLE 4-continued

| Component | K (g/l) | L (g/l) | M (g/l) |
|---|---|---|---|
| Adjuvant A | 125 | 125 | 125 |
| Adjuvant B | 125 | 125 | 125 |
| 1,2-Propylen glycol | 80 | 80 | 80 |
| Bactericide | 2 | 2 | 2 |
| Stabilizer A | 20 | 20 | 20 |
| Stabilizer B | 40 | 40 | 40 |
| Xanthan Gum | 2 | 2 | 2 |
| Antifoamer | 5 | 5 | 5 |
| Water | To 1 liter | To 1 liter | To 1 liter |

Example-9

Stability of the Particle Size of SC K-M

The increase of the particle size upon storage of SC K-M was tested with a sample at 54° C. for two weeks, with another sample in a daily cycling temperature from −10° C. to +10° C. for two weeks, and with another sample at −10° C. for two weeks, respectively.

The particle size of the pesticide particles was determined before and after storage by Malvern Mastersizer 2000. No increase in particle size was found at all storage temperatures.

Example-10

Storage Stability of SC K-M

For evaluation of the storage stability of SC K-M, samples were prepared as described in Example-9.

The SC-stability was determined by visual observation of the samples. No noticeable phase separation occurred in all samples.

Example-11

Biological Efficacy Enhancement

The adjuvant effect was tested in greenhouse trials on (a) *Echinochloa crus-galli*, (b) *Digitaria sanguinalis*, (c) *Astragalus vogelii*, (d) *Setaria faberi* and (e) *Alopecurus mysuroides*. The plants were sprayed with SC-N and SC-O according to Table 5, comprising topramezone (3.8 g/ha), atrazine (93.7 g/ha) and either Adjuvant B alone or in mixture with Adjuvant A. For comparison, a diluted suspension concentrate SC-P was sprayed with the same application rates of the topramezone and the atrazine, but without the Adjuvant A and without Adjuvant B.

TABLE 5

| Component | N (g/l) | O (g/l) |
|---|---|---|
| Atrazine | 300 | 300 |
| Topramezone | 12 | 12 |
| Adjuvant A | 125 | — |
| Adjuvant B | 125 | 250 |
| Ionic Surfactant A | 20 | 20 |
| Ionic Surfactant B | 50 | 50 |
| Bactericide | 2 | 2 |
| Auxiliary A | 30 | 30 |
| Xanthan Gum | 3 | 3 |
| Antifoamer | 5 | 5 |
| Water | To 1 liter | To 1 liter |

The herbicidal activity was evaluated 20 days after treatment by awarding scores to the treated plants (three replicates each) in comparison to the untreated control plants (Table 6). The evaluation scale ranges from 0% go 100% activity. 100% activity means the complete death of at least those parts of the plant that are above ground. Conversely, 0% activity means that there were no differences between treated and untreated plants. The effective concentration of the sum of the active ingredients was 97.5 g/ha, wherein effective concentration means the total mass of active ingredients per treated area. The results are displayed in Table 6.

TABLE 6

| Herbicidal activity [%] on various plant species (a)-(e) | | | | |
|---|---|---|---|---|
| (a) | (b) | (c) | (d) | (e) |
| N | 95 | 90 | 95 | 98 | 90 |
| O | 80 | 80 | 80 | 90 | 85 |
| P | 45 | 40 | 40 | 75 | 60 |

Example-12

Biological Efficacy at Varying Pesticide Concentrations

In another experiment, the adjuvant effect was tested in greenhouse trials on *Sorghum halepense* with varying effective concentrations of the pesticides. The plants were sprayed with SC—N and SC—O according to Table 5 and Example-11, wherein the active amount of pesticides amounted to 195 g/ha or 97.5 g/ha, respectively. The herbicidal effect was evaluated as described in Example-11 and scaled from 0% go 100% activity. The results are displayed in Table 7.

TABLE 7

| Herbicidal activity [%] on *Sorghum halepense* depending on the effective amount of pesticides. | |
|---|---|
| 195 g/ha | 95.5 g/ha |
| N | 98 | 60 |
| O | 75 | 20 |
| P | 75 | 0 |

The invention claimed is:

1. An agrochemical aqueous suspension concentrate comprising a pesticide in the form of pesticide particles and at least 5 wt % of an adjuvant dissolved in the aqueous phase, wherein the adjuvant is of the formula (I)

$$R^1-O-EO_m-PO_n-EO_o-H \quad (I)$$

wherein
$R^1$ is a linear $C_{16-18}$ alkyl;
EO is ethyleneoxy;
PO is propyleneoxy;
m has a value from 3 to 5;
n has a value from 13 to 15; and
o has a value from 3.5 to 5.5.

2. The suspension concentrate according to claim 1, comprising 50 to 400 g/l of the pesticide.

3. The suspension concentrate according to claim 1, wherein said suspension concentrate comprises less than 3 wt % of an organic solvent.

4. The suspension concentrate according to claim 1, wherein the adjuvant has a solubility in distilled water at 23° C. of at least 5 g/l.

5. The suspension concentrate according to claim 1, wherein said suspension concentrate comprises a second adjuvant, wherein the second adjuvant is of the formula (II)

$$R^2-O-EO_x-PO_y-EO_z-H \quad (II)$$

wherein
$R^2$ is a $C_{6-11}$ alkyl;
EO is ethyleneoxy;
PO is propyleneoxy;
x has a value from 1 to 20;
y has a value from 1 to 30; and
z has a value from 0 to 10.

6. The suspension concentrate according to claim 5, wherein
x has a value from 3 to 15;
y has a value from 2 to 10; and
z has a value from 1.5 to 8.

7. An adjuvant of formula (I)

$$R^1-O-EO_m-PO_n-EO_o-H \quad (I)$$

wherein
$R^1$ is a linear $C_{16-18}$ alkyl;
EO is ethyleneoxy;
PO is propyleneoxy;
m has a value from 3 to 5;
n has a value from 13 to 15; and
o has a value from 3.5 to 5.5,
wherein the adjuvant has a solubility in distilled water at 23° C. of at least 5 g/l.

8. A method of preparing the suspension concentrate according to claim 1, the method comprising contacting water, the pesticide, and the adjuvant.

9. A method of at least one of (a) controlling at least one of phytopathogenic fungi, undesired plant growth, and undesired insect or mite attack, and (b) regulating the growth of plants, the method comprising allowing the suspension concentrate of claim 1 to act on at least one of a respective fungi, plant growth, insect, mite, plant, and an environment thereof.

10. A seed comprising the suspension concentrate as defined in claim 1.

11. The suspension concentrate according to claim 1, wherein
m is 3.9;
n is 14; and
o is 4.

12. The adjuvant of formula (I) according to claim 7, wherein
m is 3.9;
n is 14; and
o is 4.

* * * * *